(12) United States Patent
Camenisch et al.

(10) Patent No.: US 9,596,086 B2
(45) Date of Patent: *Mar. 14, 2017

(54) PASSWORD-BASED AUTHENTICATION

(71) Applicant: INTERNATIONAL BUSINESS MACHINES CORPORATION, Armonk, NY (US)

(72) Inventors: Jan L. Camenisch, Rueschlikon (CH); Anja Lehmann, Rueschlikon (CH); Gregory Neven, Rueschlikon (CH)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/745,086

(22) Filed: Jun. 19, 2015

(65) Prior Publication Data

US 2015/0341173 A1 Nov. 26, 2015

Related U.S. Application Data

(63) Continuation of application No. 14/720,099, filed on May 22, 2015.

(30) Foreign Application Priority Data

May 23, 2014 (GB) .................................. 1409227.4

(51) Int. Cl.
*H04L 29/06* (2006.01)
*H04L 9/32* (2006.01)
(Continued)

(52) U.S. Cl.
CPC ............ *H04L 9/3226* (2013.01); *G06F 21/31* (2013.01); *G06F 21/40* (2013.01); *H04L 9/085* (2013.01);
(Continued)

(58) Field of Classification Search
None
See application file for complete search history.

(56) References Cited

U.S. PATENT DOCUMENTS 7,725,730 B2 * 5/2010 Juels .................. H04L 63/083
340/5.85
9,118,661 B1 * 8/2015 Juels .................. H04L 63/0838
(Continued)

FOREIGN PATENT DOCUMENTS

CN 102333308 A 1/2012

OTHER PUBLICATIONS

Desmedt, Y., et al., "Threshold Cryptosystems," Advances in Cryptology—CRYPTO '89, 9th Annual International Cryptology Conference, Aug. 1989. (pp. 307-315).
(Continued)

*Primary Examiner* — Christopher Revak
(74) *Attorney, Agent, or Firm* — Tutunjian & Bitetto, P.C.; Jeff LaBaw

(57) ABSTRACT

A password authentication system includes an access control server configured to control access by a user computer to a resource dependent on authentication of user passwords associated with user IDs. The system further includes a plurality of authentication servers, storing respective secret values. For each user ID, the access control server stores a first ciphertext produced by encrypting the user password associated with that ID using a predetermined algorithm dependent on the secret values. In response to receipt of a user ID and an input password, the access control server communicates with the plurality of authentication servers to implement password authentication, requiring use of the secret values, in which a second ciphertext is produced by encrypting the input password using said predetermined algorithm. The access control server compares the first and
(Continued)

second ciphertexts to determine whether the input password equals the user password to permit access to the resource.

10 Claims, 9 Drawing Sheets

(51) Int. Cl.
*G06F 21/31* (2013.01)
*H04L 9/08* (2006.01)
*G06F 21/40* (2013.01)

(52) U.S. Cl.
CPC ............ *H04L 63/08* (2013.01); *H04L 63/083* (2013.01); *H04L 63/0823* (2013.01); *H04L 63/0876* (2013.01)

(56) References Cited

U.S. PATENT DOCUMENTS

| | | |
|---|---|---|
| 2003/0163737 A1 | 8/2003 | Roskind |
| 2003/0221102 A1 | 11/2003 | Jakobsson et al. |
| 2011/0099616 A1 | 4/2011 | Mazur et al. |
| 2012/0131656 A1 | 5/2012 | Slaton et al. |
| 2013/0080787 A1 | 3/2013 | Lee et al. |
| 2014/0189808 A1* | 7/2014 | Mahaffey ............ H04L 63/0853 726/4 |

OTHER PUBLICATIONS

EMC Corporation, "RSA Distributed Credential Protection," White Paper, Oct. 2012. (pp. 1-6). Available at: http://www.emc.com/collateral/software/white-papers/h11013-rsa-dcp-0812-wp.pdf.

Herzberg, A. et al., "Proactive Secret Sharing or: How to Cope With Perpetual Leakage," Advances in Cryptology—CRYPTO '95, 15th Annual International Cryptology Conference, Aug. 1995. (pp. 339-352).

List of IBM Patents or Patent Applications Treated as Related.

Search Report for PCT No. PCT/IB2015/053688 Mailed on Oct. 9, 2015.

* cited by examiner

Password Authentication Protocol #2

Unblock Protocol

PASSWORD-BASED AUTHENTICATION

RELATED APPLICATION DATA

This application is a Continuation application of co-pending U.S. patent application Ser. No. 14/720,099 filed on May 22, 2015, which claims priority under 35 U.S.C. §119 from United Kingdom Patent Application No. 1409227.4 filed May 23, 2014, both of which are incorporated herein by reference in their entirety.

BACKGROUND

Technical Field

This invention generally relates to password-based authentication in data processing systems whereby access to a resource is controlled in dependence on authentication of user passwords. Multi-server systems are provided for authenticating user passwords, together with corresponding methods, component servers and computer programs for configuring the servers.

Description of the Related Art

Passwords are the most prevalent mechanism for user authentication in data processing systems. For a long time, phishing attacks and keystroke-logging malware on user computers were the preferred methods for hackers to capture large numbers of user passwords. More recently, however, the main risk to password security seems to stem from server compromise. In 2012 alone, tens of millions of passwords were reported lost in this way, with major data breaches occurring at various popular websites.

In conventional password-based authentication systems, users connect to a server which controls access to the protected resource and maintains a database of user IDs, e.g., user names, with their associated user passwords stored in hashed form. On receipt of a user ID and input password, the access control server hashes the input password and checks whether the result equals the stored password-hash for that user. However, all password-hashes can be stolen by hacking the access control server (or associated password-hash database). Storing passwords in hashed form offers little protection due to the efficiency of offline attacks using dictionaries or brute-forcing of the message space. The National Institute of Standards and Technology has estimated that human-memorizable passwords of even sixteen characters length have only 30 bits of entropy, corresponding to about one billion possible combinations. With current graphical processors that can test more than eight billion combinations per second, security should be considered lost as soon as an offline attack can be mounted against the password data.

To reduce exposure to offline attacks through server compromise, password-based authentication can be performed by a plurality of servers. Authentication protocols in which the password-based authentication data is split between multiple servers are known, for example, as part of authenticated key-exchange or authenticated secret-sharing protocols. Prior multi-server password-authentication systems require the user computer to interact with all servers in the authentication protocol, since information of all servers is required for authentication. Two-server password-based authentication systems are also known. "RSA Distributed Credential Protection", RSA Security, Whitepaper 2012, describes an example of such a system. Here, the password-based authentication data is split between two servers. The user sends her password, in randomized and split form, to the two servers, which then interact to verify the password, granting access if the password is correct.

Improvements in multi-server password authentication systems would be highly desirable.

SUMMARY

An embodiment of a first aspect of the present invention provides a system comprising:

an access control server for communication with user computers via a network and controlling access by the user computers to a resource in dependence on authentication of user passwords associated with respective user IDs; and a plurality n of authentication servers, storing respective secret values, for communication with the access control server via the network;

wherein the access control server stores, for each said user ID, a first ciphertext produced by encrypting the user password associated with that ID using a predetermined algorithm dependent on said secret values;

and wherein the access control server and authentication servers are adapted such that, in response to receipt from a user computer of a said user ID and an input password, the access control server communicates with a plurality $k \leq n$ of the authentication servers to implement a password authentication protocol, requiring use by the k authentication servers of their respective secret values, in which a second ciphertext is produced by encrypting the input password using said predetermined algorithm and the access control server uses the first and second ciphertexts to determine whether the input password equals the user password for the received user ID, if so permitting access to the resource by the user computer.

In systems embodying this invention, the access control server provides both the access point to the resource and also centralized control of a multi-server password-based authentication protocol for connecting users. Implementation of this protocol requires cooperation of $k \leq n$ authentication servers with the access control server, and these authentication servers must use their respective secret values in this process. However, validity of an input password is determined centrally by the access control server based on communications with the k servers. The protocol does not require the access control server (or any other server) to reconstruct the user password. Authentication is based on use of the first and second ciphertexts which are produced, respectively, from the authentic user password and the input password attempt using the predetermined encryption algorithm dependent on the secret values of the authentication servers. Systems embodying the invention may provide secure and efficient password-based authentication. User computers need only communicate with the access control server and are not otherwise involved in implementation of the authentication protocol. Embodiments of the invention may offer security against offline attacks and also permit implementation of an efficient update mechanism, whereby secret values can be updated to reinforce security, e.g., periodically or in response to a known security breach. Additional advantages of systems embodying the invention will be explained in connection with particular embodiments described below.

The secret values of the servers may comprise cryptographic keys, or key-shares, or any other strong secrets known only to the respective servers in the system. The encryption algorithm used to generate the ciphertexts may depend on these secret values, directly or indirectly, in a variety of ways. For example, the secret values may be used in the algorithm, or the algorithm may use a public key of a cryptographic key-pair and the secret values may comprise respective key-shares of a secret key of the key-pair. The second ciphertext may be produced by using the encryption algorithm to encrypt the input password directly or after further processing of the input password to produce some function thereof.

In a first preferred embodiment, the authentication protocol is implemented by the access control server and k=n authentication servers. The first ciphertext comprises pseudorandom values derived from: the n secret values of the authentication servers; the user password for a user ID; and preferably a further secret value stored by the access control server. To implement the password verification protocol when a user logs in, the access control server orchestrates production of the second ciphertext, in like manner to the first ciphertext, from the secret values and the input password. The access control server then simply compares the first and second ciphertexts to determine if the input password equals the user password for the user ID.

In a second preferred embodiment, the first ciphertext is produced using a homomorphic encryption algorithm for encrypting the user password under a public key of a cryptographic key-pair. The secret values of the authentication servers comprise respective key-shares of a secret key of the key-pair. To implement the password authentication protocol at user log-in, the access control server produces the second ciphertext from the input password using said homomorphic encryption algorithm. The access control server then produces a test value by combining, via an operation $\odot$, the second ciphertext and the first ciphertext for the received user ID, the operation $\odot$ being such that, due to the homomorphism of said encryption algorithm, the test value decrypts to a predetermined value if the input password equals the user password. The test value is sent to the k authentication servers which use their secret key-shares to produce respective decryption share dependent on the test value. The access control server then determines from the k decryption shares whether the test value decrypts to said predetermined value, and hence the input password equals the user password. If the homomorphic encryption algorithm is a threshold encryption algorithm requiring less than n decryption shares for decryption, the password authentication protocol can be implemented using k<n authentication servers.

For maximum security against offline attacks, the access control server sends the received user ID to each authentication server in the password authentication protocol of preferred embodiments, and each authentication server implements a throttling mechanism for each user ID. Throttling mechanisms are well known in cryptography, providing procedures for monitoring logins by system users and determining based on login behavior if any particular user account should be blocked. Throttling mechanisms generally block user accounts if the login behavior satisfies a predefined criterion indicative of potentially malicious action, e.g., if more than a threshold number of login requests are made within a given time and/or with an incorrect password. The first preferred embodiment detailed below implements a throttling mechanism based on user login frequency. The second preferred embodiment can implement throttling based on a combination of login frequency and incorrect password entry.

In preferred embodiments, the access control server and authentication servers are further adapted to implement a password setup protocol for user accounts. In particular, the access control server and authentication servers can be adapted such that, in response to initial input of a said user password and associated user ID in a setup operation, the access control server communicates with the n authentication servers to implement a password setup protocol, comprising generation of said first ciphertext for that user ID and storage of the first ciphertext at the access control server, to permit subsequent implementation of said verification protocol for that user ID. The preferred embodiments also provide an efficient update operation allowing secret values to be updated as required.

An embodiment of a second aspect of the invention provides a server comprising memory, a communications interface, and control logic adapted to configure the server to implement an access control server of a system according to the first aspect of the invention, wherein said memory stores said first ciphertext for each user ID in use.

An embodiment of a third aspect of the invention provides a server comprising memory, a communications interface, and control logic adapted to configure the server to implement an authentication server of a system according to the first aspect of the invention, wherein said memory stores said secret value of the authentication server in use.

Further aspects of the invention provide computer programs comprising program code means for causing a computer to implement, respectively, the control logic of a server according to the second or third aspects of the invention. The term "computer" is used in the most general sense and includes any device, component or system having a data processing capability for implementing a computer program. Moreover, a computer program embodying the invention may constitute an independent program or program set or may be an element of a larger program or program set, and may be supplied, for example, embodied in a computer-readable medium such as a disk or an electronic transmission for loading in a computer. The program code means of the computer program may comprise any expression, in any language, code or notation, of a set of instructions intended to cause a computer to perform the method in question, either directly or after either or both of (a) conversion to another language, code or notation, and (b) reproduction in a different material form.

An embodiment of another aspect of the invention provides a method for controlling access by user computers to a resource in dependence on authentication of user passwords, associated with respective user IDs, at an access control server arranged for communication via a network with the user computers and a plurality n of authentication servers. The method comprises:

storing respective secret values at the n authentication servers;

for each said user ID, storing at the access control server a first ciphertext produced by encrypting the user password associated with that ID using a predetermined algorithm dependent on said secret values;

at the access control server, in response to receipt from a user computer of a said user ID and an input password, communicating with a plurality k≤n of the authentication servers to implement a password authentication protocol, requiring use by the k authentication servers of their respective secret values, in which a second ciphertext is produced by encrypting the input password using said predetermined algorithm and the access control server uses the first and second ciphertexts to determine whether the input password equals the user password for the received user ID; and at the access control server, permitting access to the resource by the user computer if the input password equals the user password.

Where features are described herein with reference to an embodiment of one aspect of the invention, corresponding features may be provided in embodiments of another aspect of the invention as appropriate.

BRIEF DESCRIPTION OF THE DRAWINGS

Preferred embodiments of the invention will now be described, by way of example, with reference to the accompanying drawings in which.

DETAILED DESCRIPTION OF THE EMBODIMENTS

Figure 1:
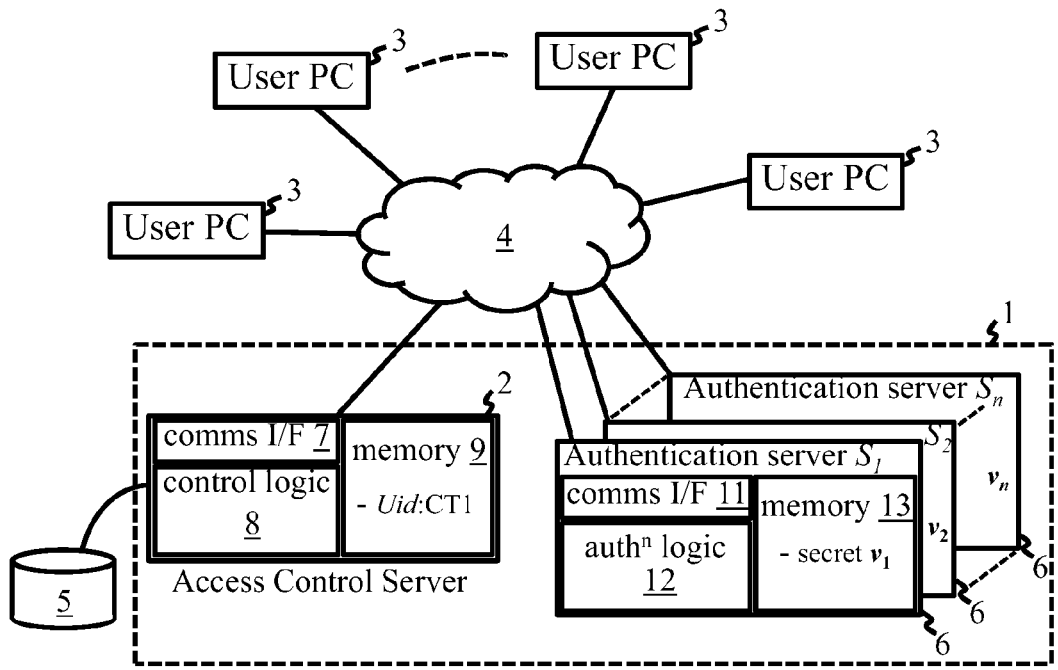
FIG. 1 is a schematic illustration of a data processing system including a password authentication system embodying the invention.

FIG. 1 shows a simple example of a data processing system incorporating an authentication system embodying the invention. The authentication system, indicated generally as 1, includes an access control server 2 arranged for communication with a plurality of user computers 3 via a network 4. The network 4 may in general comprise one or more component networks or internetworks, including the Internet. The user computers 3 are general-purpose personal computers ("PCs") in this example, but may equally be implemented by other computer devices such as mobile phones, tablet computers, personal music players, palmtop devices, etc. The access control server 2 controls access by the user computers 3 to a resource, in this example a database 5. Access is permitted in dependence on authentication of user passwords associated with respective user IDs, e.g., user names, which are input by users via PCs 3 in operation.

The authentication system 1 also includes a plurality of authentication servers 6, labeled $S_1, S_2, \ldots, S_n$, arranged for communication with the access control server 2 via network 4. The n authentication servers 6 are adapted to cooperate with the access control server 2 to implement a multi-server password authentication protocol detailed below. The number n of authentication servers 6 can vary for different embodiments, but a typical system may employ between two and ten authentication servers 6 depending on the particular password authentication protocol and required level of security. In general, the authentication servers 6 may be located at the same location as access control server 2 or at one or more different locations, and may be controlled by the same entity as the access control server 2 or by one or more different entities. Distribution and control of the servers 2, 6 can thus be selected according to particular security requirements for a given system.

Each of the access control and authentication servers 2, 6 may be embodied as a general-purpose computer configured to implement the respective server functionality. Access control server 2 is shown simply here as comprising a communications interface ("I/F") 7 for communications over network 4, control logic 8, and memory 9. The control logic 8 generally controls operation of access control server 2 and provides functionality for implementing steps of the password authentication and related protocols detailed below. Memory 9 stores various data used by the control logic 8 in operation. This includes a first ciphertext CT1 for the user ID ("Uid") of each authorized user of the system. Each authentication server 6 is similarly shown as comprising a communications interface 11, authentication logic 12 providing functionality for use in the protocols detailed below, and memory 13 which stores data used by authentication logic 12 in operation. This includes a secret value $v_i$ known only to that particular server $S_i$ in the system. In general, the control logic 8 and authentication logic 12 could be implemented in hardware or software or a combination thereof. In this example, the logic 8, 12 is conveniently implemented by software running on the respective computer 2, 6 for causing the computer to perform the functions described.

Figure 2:
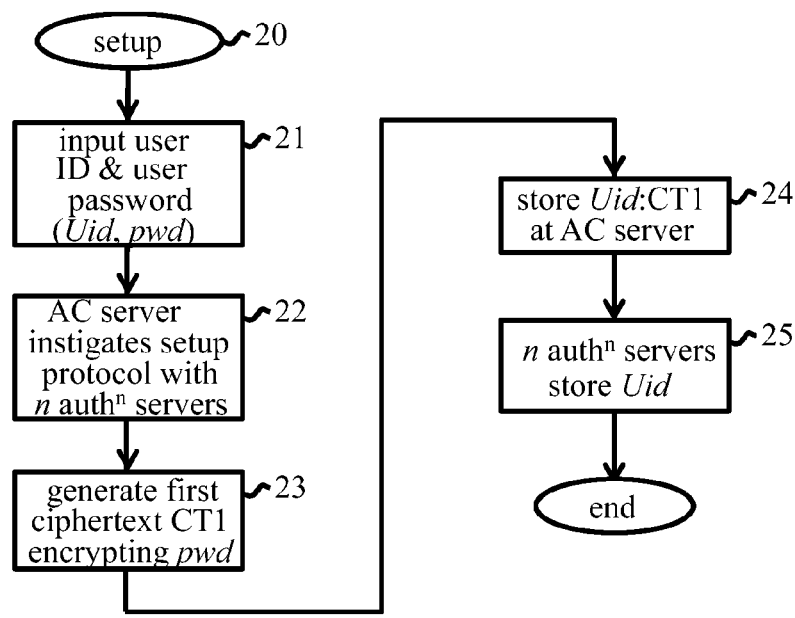
FIG. 2 indicates features of a setup procedure in operation of the password authentication system.

FIG. 2 is a generalized block diagram indicating key features of a setup procedure for setting up a user account in operation of the password authentication system 1. On initiation of the setup operation, as indicated at step 20, the user ID ("Uid") and associated user password ("pwd") to be used for subsequent authentication of a user are input to access control ("AC") server 2 in step 21. In a typical application, the user ID and password are entered by the user here via a user computer 3, and are sent via network 4 to AC server 2. The AC server 2 responds in step 22 by instigating a password setup protocol. This protocol is implemented via communication of AC server 2 and the n authentication servers $S_1$ to $S_n$. The setup protocol involves generation of the first ciphertext CT1 for the input user ID as indicated at step 23. The ciphertext CT1 is produced by encrypting the user password pwd using a predetermined algorithm which is dependent on the secret values $v_1$ to $v_n$ of the n authentication servers 6. This is explained further below. The first ciphertext CT1 is stored by the AC server 2 with the user ID Uid for the authorized user as indicated at step 24. The n authentication servers 6 store the user ID Uid as indicated at step 25 (typically with one or more other items such as an "account-blocked" flag controlled by a throttling mechanism discussed further below). Note that the order of steps 24 and 25 may vary in different implementations as illustrated below. The password setup protocol is then complete and the user account is ready for use in a subsequent login procedure.

Figure 3:
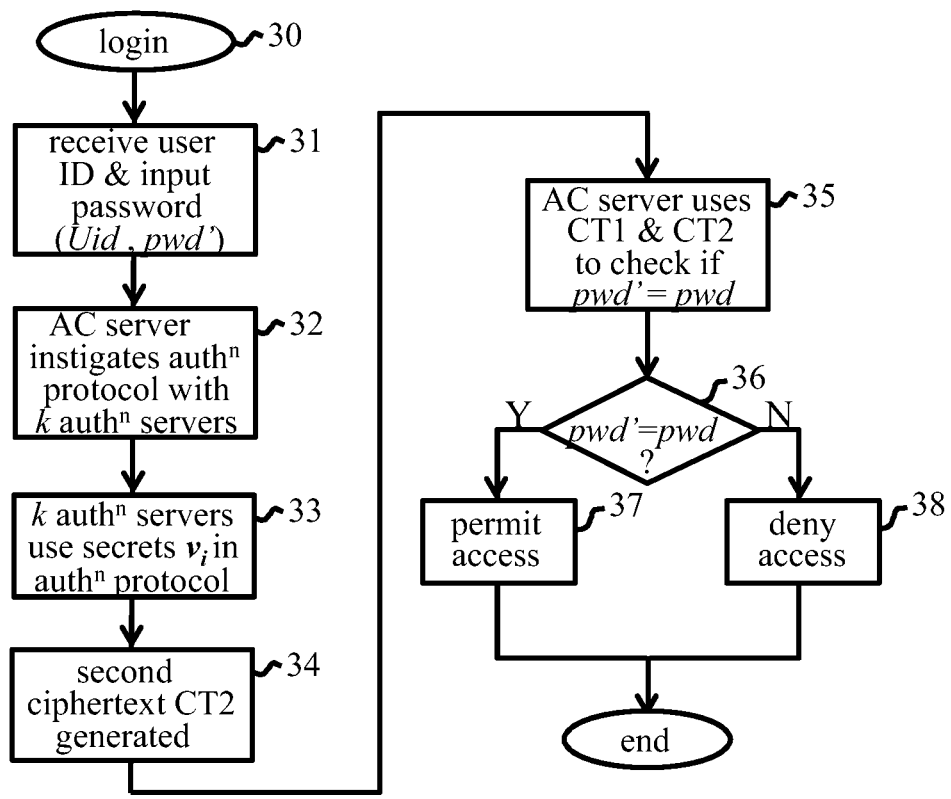
FIG. 3 indicates features of a login procedure in operation of the password authentication system.

FIG. 3 is a generalized block diagram giving an overview of the login procedure in operation of the password authentication system 1. The login procedure begins at step 30 when a user operating a user computer 3 inputs a password pwd' (i.e., an attempt at the user password pwd) and user ID Uid. The inputs Uid, pwd' are sent over network 4 and received by the AC server 2 in step 31. The AC server 2 responds in step 32 by instigating a verification protocol for authenticating the input password pwd'. This password authentication protocol is implemented via communication of AC server 2 with a plurality k≤n of the authentication servers 6 $S_1$ to $S_n$, where the value of k depends on the particular protocol implementation. Successful operation of the protocol requires the k authentication servers 6 to use their respective secret values $v_i$ as indicated at block 33 in the figure. The protocol involves generation of a second ciphertext CT2 as indicated at block 34. This ciphertext CT2 is produced in system 1 by encrypting the input password pwd' using the algorithm used in the setup protocol to produce the first ciphertext CT1. The AC server 2 then users the first and second ciphertexts CT1, CT2 to determine in step 35 whether the input password pwd' equals the user password pwd for the user ID received in step 31. If so ("Y" at decision block 36), the AC server 2 permits the user access to the database 5 as indicated at step 37, and the login process in complete. If the input password pwd' is invalid, ("N" at decision block 36), the AC server 2 denies access at step 38 and may notify the user accordingly. Note, again, that the order of steps indicated by blocks of FIG. 3 may vary in different implementations as illustrated by the examples below.

Figure 4:
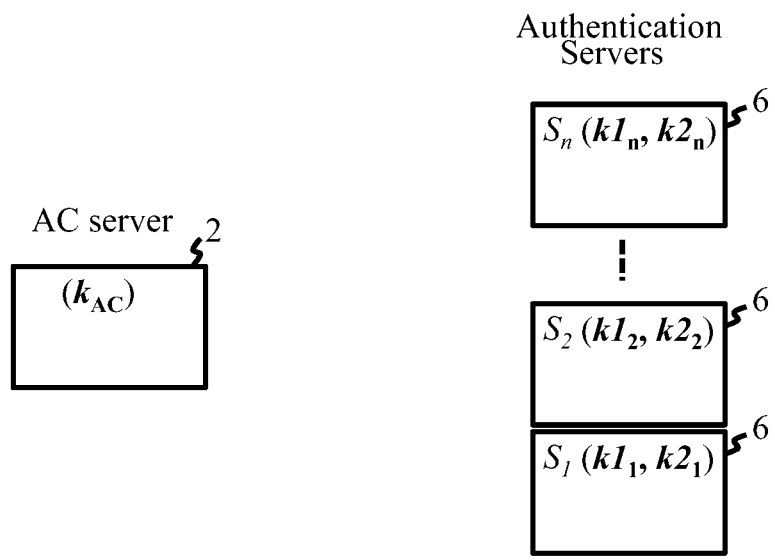
FIG. 4 illustrates configuration of a first embodiment of the password authentication system for implementing a first password authentication protocol.

A first embodiment of authentication system 1, configured to implement a first password authentication protocol, will now be described in detail with reference to FIGS. 4 to 7. The first password authentication protocol is based on symmetric cryptography using a pseudorandom function and XOR (i.e., modulo-2 addition) operations. FIG. 4 illustrates an initial configuration of the system servers in this embodiment. Each of the n authentication servers 6 $S_1$ to $S_n$ stores two symmetric keys denoted by $k1_i$ and $k2_i$. (The key $k2_i$ here corresponds to the secret server value $v_i$ discussed above. The key $k1_i$ used here could be replaced by any unique server ID as discussed further below.) In this embodiment, the AC server 2 stores a further secret value, here a further symmetric key denoted by $k_{AC}$. The system operates with secure communications between the servers 2, 6, i.e., via authenticated and confidential channels with forward-secrecy. These properties can be achieved in known manner, e.g., using Secure Sockets Layer ("SSL") or Transport Layer Security ("TLS") protocols.

Setup Protocol Embodiment #1

Figure 5A:
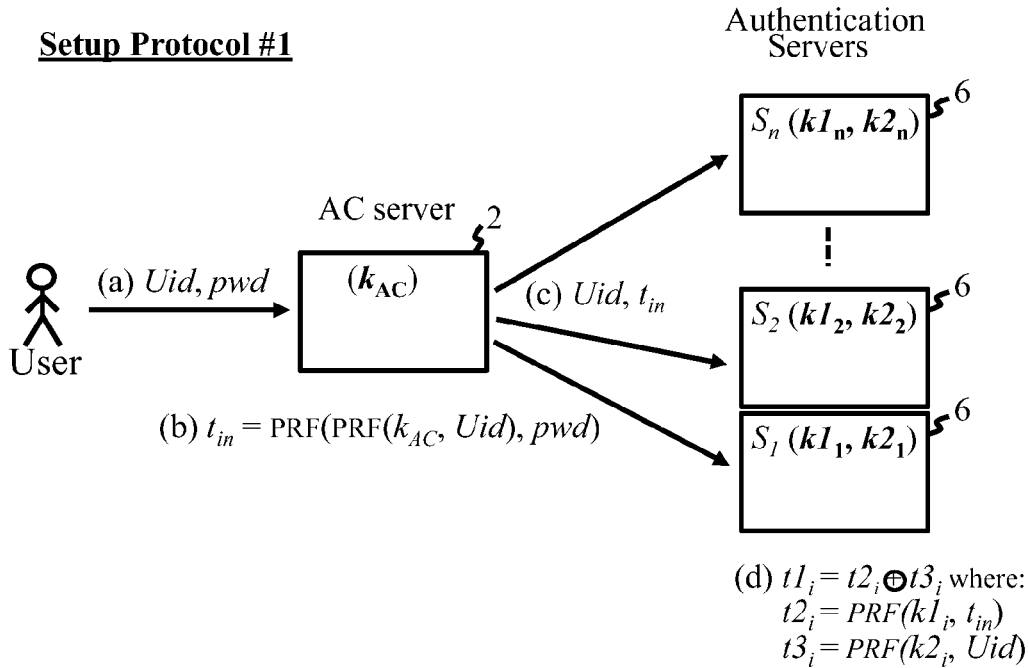
FIGS. 5a and 5b indicate steps of a setup protocol in the first embodiment.
Figure 5B:
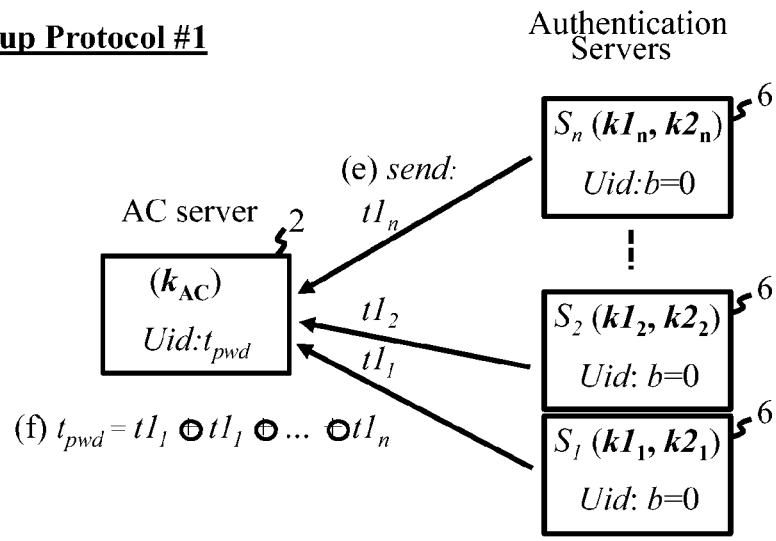

FIGS. 5a and 5b indicate successive stages of the setup protocol in this embodiment. The operation begins, as indicated at (a) in FIG. 5a, when a user supplies a user ID Uid and user password pwd to the AC server 2 via a user PC 3. In step (b), the control logic 8 of AC server 2 produces an initial pseudorandom value $t_{in}$ which encrypts the user password pwd via a pseudorandom function PRF. The initial pseudorandom value $t_{in}$ also encrypts the secret key $k_{AC}$ of the AC server 2 and (to avoid collision if a different user picks the same password) the user ID Uid. Specifically in this example, the initial pseudorandom value $t_{in}$ is computed as:

$$t_{in} \leftarrow PRF(PRF(k_{AC},Uid),pwd).$$

In step (c), the AC server 2 sends the user ID Uid and the initial pseudorandom value $t_{in}$ to the n authentication servers 6 $S_1$ to $S_n$ via communications interface 7 and network 4. The values (Uid, pwd) are received by the authentication logic 12 of each authentication server 6 via the communications interface 11.

In the next step indicated at (d) in FIG. 5a, the authentication logic 12 of each authentication server 6 $S_i$ uses the initial pseudorandom value $t_{in}$ to produce a respective first pseudorandom value $t1_i$. This first pseudorandom value comprises a modulo-2 sum of second and third pseudorandom values $t2_i$ and $t3_i$ respectively. The second pseudorandom value $t2_i$ encrypts the initial pseudorandom value $t_{in}$ via the pseudorandom function PRF. The second pseudorandom value $t2_i$ also encrypts, via the pseudorandom function PRF, a server ID for the respective authentication server 6, where the server key $k1_i$ constitutes the server ID here. The third pseudorandom value encrypts, via the pseudorandom function PRF, the secret value $v_i=k2_i$ of the authentication server 6 $S_i$ and the received user ID Uid (which is associated with the user password encrypted in the initial pseudorandom value $t_{in}$). Specifically:

$$t1_i \leftarrow t2_i \oplus t3_i$$

$$\leftarrow PRF(k1_i,t_{in}) \oplus PRF(k2_i,Uid),$$

where $\oplus$ represents the modulo-2 addition (XOR) operation. The second term $t3_i$ in this formula provides the basis for a proactive update procedure discussed further below.

In the next stage of the setup operation as indicated at (e) in FIG. 5b, each authentication server 6 $S_i$ sends its respective first pseudorandom value $t1_i$ to the AC server 2. The control logic 8 of AC server 2 then produces the first ciphertext CT1 from the n first pseudorandom values $t1_i$. The first ciphertext CT1, denoted by $t_{pwd}$ in this embodiment, is given by:

$$t_{pwd}=t1_1 \oplus t1_2 \oplus t1_3 \ldots \oplus t1_n.$$

It will therefore be seen that the first ciphertext in this embodiment comprises a modulo-2 sum of the n first pseudorandom values $t1_i$ each of which encrypts, via the pseudorandom function, the secret value $k2_i$ of a respective authentication server and the initial pseudorandom value $t_{in}$ which, in turn, encrypts the user password pwd and the secret value $k_{AC}$ of the AC server 2.

As indicated in FIG. 5b, at the end of the setup protocol for this user, the AC server 2 stores the first ciphertext $t_{pwd}$ for the user ID Uid in its memory 9. Memory 13 of each authentication server 6 stores Uid and an "account-blocked" bit b={0, 1} which indicates whether the user account is blocked (b=1) or open (b=0). Initially, this bit is set to b=0. The individual pseudorandom values $t_{in}$, $t1_i$ are not stored by any of the servers 2, 6 and are deleted after use in setting up the user account.

Password Authentication Protocol Embodiment #1

Figure 6A:
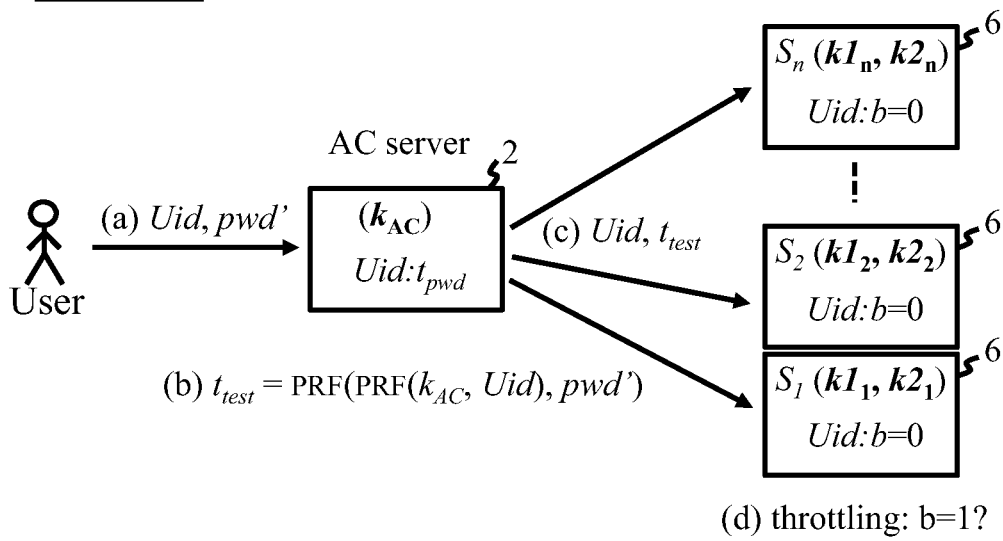
FIGS. 6a and 6b indicate steps of the password authentication protocol in the first embodiment.
Figure 6B:
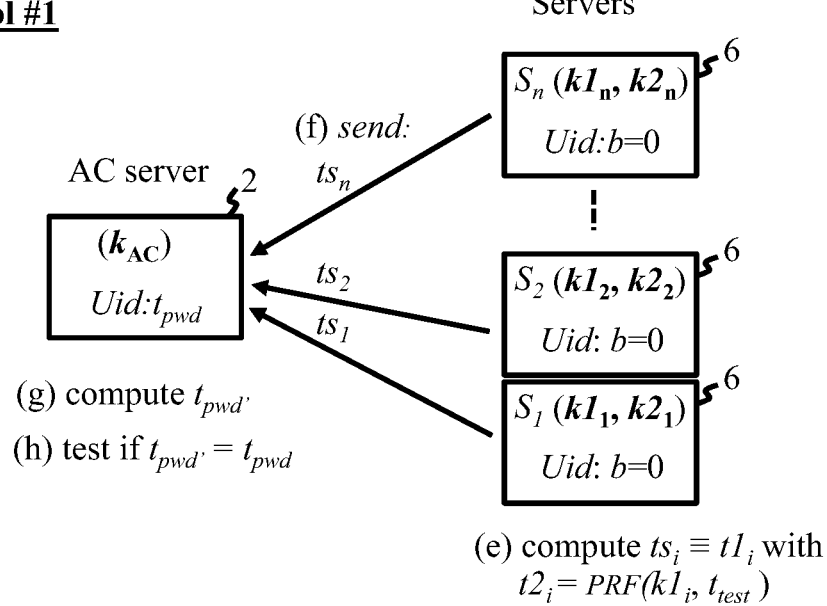
Figure 7:
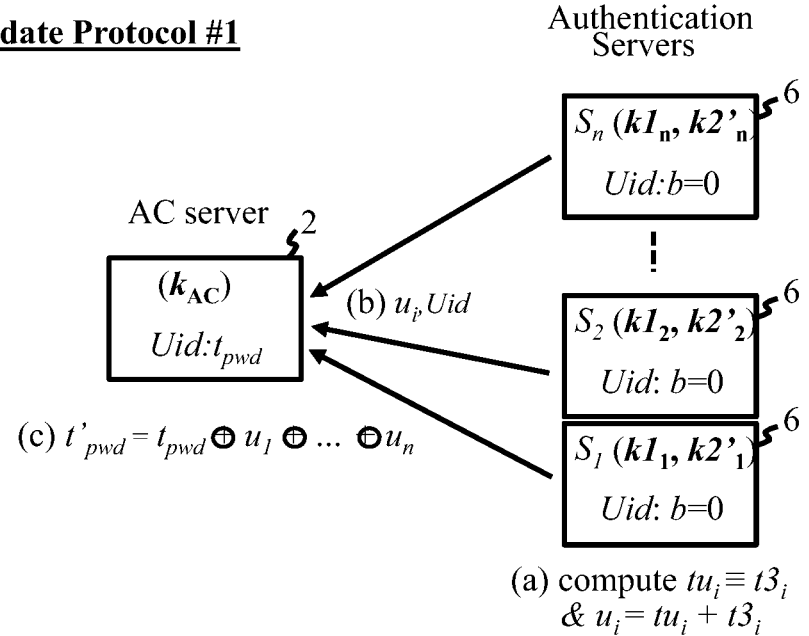
FIG. 7 indicates steps of an update protocol in the first embodiment.

In a subsequent login for the user account, the AC server 2 communicates with k=n authentication servers 6 to implement the password authentication protocol. FIGS. 6a and 6b indicate successive stages of the password authentication protocol in this embodiment. Operation begins, as indicated at (a) in FIG. 6a, when the user supplies the user ID Uid and inputs a user password pwd' via a user PC 3. On receipt of the values (Uid, pwd'), the AC server 2 checks if a user record (Uid, $t_{pwd}$) exists in memory 9. If not, login fails. If so, the subsequent operation corresponds generally to the setup protocol above but uses the input password pwd'. Hence, in step (b) the AC server logic uses the input password pwd' to produce a test pseudorandom value $t_{test}$ which corresponds to the initial pseudorandom value $t_{in}$. The test pseudorandom value $t_{test}$ is thus produced in like manner to initial pseudorandom value $t_{in}$ but uses the input password pwd' instead of the user password pwd. In step (c), the AC server sends the test pseudorandom value $t_{test}$ to each authentication server $S_1$ to $S_n$ with the received user ID Uid. At this point, as indicated at step (d), each authentication server 6 checks whether the user account has been blocked (i.e., flag b for Uid is set to b=1) due to operation of a throttling mechanism. In particular, the authentication logic 12 of each server 6 is configured to implement a throttling mechanism for each user ID Uid based on frequency of user login requests. Various such throttling measures are known in the art and any convenient technique can be employed here. For example, an account may be blocked if more than a threshold number of login requests are received, or are received within a given time limit. Alternatively or additionally, for example, a gradually-increasing time limit may be applied for servicing user requests if suspicious login behaviour is identified, e.g., if a particular number or rate of requests is exceeded. The throttling mechanism may therefore block a user account temporarily or permanently, the latter requiring unblocking by an authorized party or renewal of a user account, depending on the particular implementation. In any case, if the user account is blocked at any authentication server 6, the login operation fails. If no server has blocked the user account, then the login operation can proceed.

In the next stage of the authentication protocol as indicated at (e) in FIG. 6b, each authentication server 6 $S_i$ uses the test pseudorandom value $t_{test}$ to produce a respective server pseudorandom value $ts_i$ which corresponds to the first pseudorandom value $t1_i$ above. That is, the server pseudorandom value $ts_i$ is produced in like manner to the first pseudorandom value $t1_i$ but uses the test pseudorandom value $t_{test}$ instead of the initial pseudorandom value $t_{in}$. Hence:

$$ts_i \leftarrow PRF(k1_i, t_{test}) \oplus PRF(k2_i, Uid).$$

In step (f), each authentication server 6 $S_i$ sends its server pseudorandom value $ts_i$ to the AC server 2. In step (g), the AC server 2 produces the second ciphertext CT2 from the n server pseudorandom values $ts_i$. The second ciphertext CT2, denoted by $t_{pwd'}$ in this embodiment, is thus given by:

$$t_{pwd'} = ts_1 \oplus ts_2 \oplus ts_3 \ldots \oplus ts_n.$$

To determine whether the input password is valid (pwd'=pwd), the AC server 2 control logic 8 simply compares the first and second ciphertexts in step (h) to determine if $t_{pwd'} = t_{pwd}$. If so, login is successful and the AC server 2 grants the user access to resource 5. If not, login fails and access is denied.

The above password authentication protocol is executed between the AC server 2 and all n authentication servers 6. A "smash-and-grab" attack, where an adversary can obtain full control over a server for a short time and grab all information, including secret keys, maintained by the corrupted server, will not breach security, as secret keys of all servers are required for the authentication process. Passwords are secure as along as at least one server 2, 6 remains honest. For example, as long as no more than n−1 authentication servers 6 and the AC server 2 are corrupted by an adversary, the adversary cannot reconstruct passwords or run offline attacks against the accumulated authentication data. The adversary would need support from the remaining honest server to test all password combinations, and this will be recognized and prevented by the honest server due to the throttling mechanism. Security is achieved solely via symmetric cryptography in this embodiment, which is fast, simple, and offers considerable advantages in terms of implementation efficiency. Moreover, the system does not require any dedicated client software at user computers 3, and the user computers need only communicate with the AC server 2 for operation of the system. The system also permits implementation of an efficient proactive security mechanism for updating server keys. This update mechanism does not require any interaction with users. The update protocol will now be explained with reference to FIG. 7.

Update Protocol Embodiment #1

The AC server 2 and each authentication server 6 are adapted to implement an update protocol in which the authentication server 6 updates its respective secret value $v_i = k2_i$ to a new secret value $k2'_i$. The protocol can be run periodically by the AC server 2 with all authentication servers 6 to further enhance security against successive server compromise. In addition, the protocol can be used to re-establish full security after a known breach. If the AC server 2 is compromised, the update protocol will include all servers. A security breach on a single authentication server 6 only requires implementation of the protocol by the AC server 2 and the affected authentication server 6. The following focuses on operation for a single authentication server 6 which can be extended to all n servers as required.

The AC server 2 sends all Uid values, for which the record should be updated, to the authentication server 6. The authentication server 6 updates its respective secret value $v_i = k2_i$ to a new secret value $k2'_i$ and uses the new secret value $k2'_i$ to produce an updated pseudorandom value $tu_i$, which corresponds to the third pseudorandom value $t3_i$ above, for each user ID Uid. That is, as indicated at step (a) in FIG. 7, the authentication server 6 chooses a new key $k2'_i$, and then computes the updated pseudorandom value $tu_i$ as:

$$tu_i \leftarrow PRF(k2'_i, Uid).$$

The authentication server 6 then produces an update value $u_i$, which comprises a modulo-2 sum of the updated pseudorandom value $tu_i$ and the third pseudorandom value $t3_i$:

$$u_i \leftarrow PRF(k2'_i, Uid) \oplus PRF(k2_i, Uid)$$

In Step (b), the authentication server 6 sends the update value $u_i$ for each Uid to the AC server 2. In step (c), the AC server 2 updates the first ciphertext $t_{pwd}$ stored for each Uid by producing a modulo-2 sum of the first ciphertext $t_{pwd}$ and the update value $u_i$. The new first ciphertext is thus given by:

$$t'_{pwd} = t_{pwd} \oplus u_i.$$

(If all server keys are updated, the new first ciphertext will therefore be given by $t'_{pwd} = t_{pwd} \oplus u_1 \oplus u_2 \ldots \oplus u_n$). The new first ciphertext is then a modulo-2 sum of the values:

$$t'_{pwd} \leftarrow PRF(k1_i, t_{in}) \oplus PRF(k2'_i, Uid)$$

as required. The old randomness $PRF(k2_i, Uid)$ is cancelled out due to the modulo-2 addition, whereby the lost $k2_i$ becomes useless. The new first ciphertext is then stored by the AC server 2 for the user ID.

Figure 8:
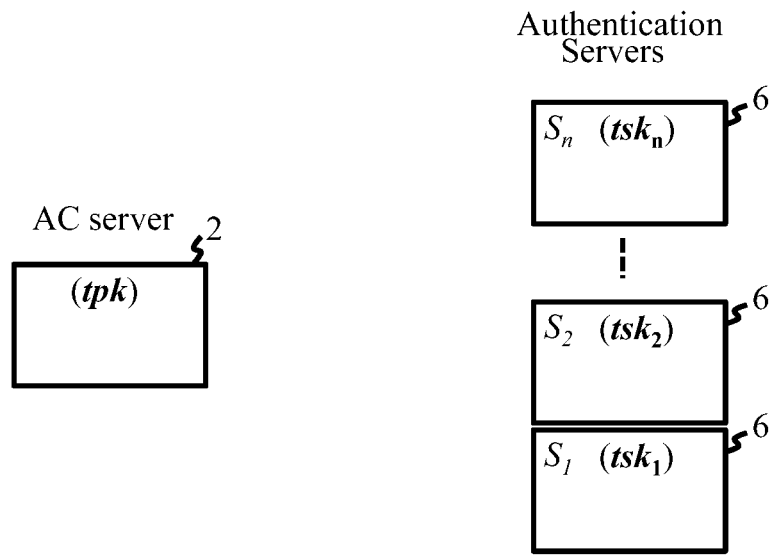
FIG. 8 illustrates configuration of a second embodiment of the password authentication system for implementing a second password authentication protocol.

A second embodiment of authentication system 1, adapted for implementing a second password authentication protocol, will now be described in detail with reference to FIGS. 8 to 12. The second password authentication protocol is based on a homomorphic threshold encryption scheme. FIG. 8 illustrates an initial configuration of the system servers in this embodiment. The AC server 2 stores a public key tpk of a cryptographic (public/secret) key-pair. The secret values $v_i$ stored by the authentication servers $\mathbf{6}$ $S_i$ comprise respective key-shares $tsk_i$ of the secret key of this key-pair. The system operates with secure communications between the servers $\mathbf{2}$, $\mathbf{6}$ as before.

Setup Protocol Embodiment #2

Figure 9:
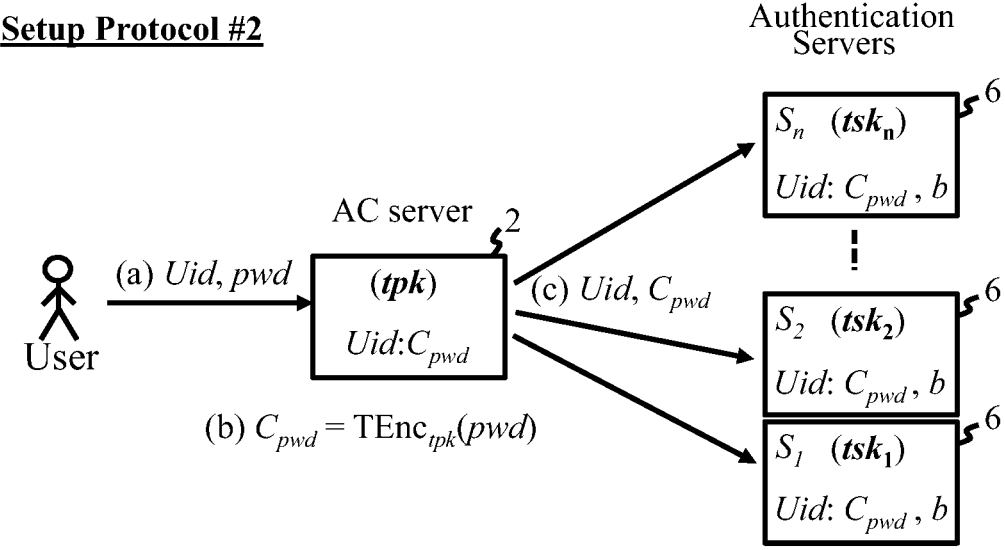
FIG. 9 indicates steps of a setup protocol in the second embodiment.

FIG. 9 indicates steps of the setup protocol to create a user account in this embodiment. The operation begins at step (a) with input of a user ID Uid and user password pwd to the AC server 2. In step (b), the AC server 2 produces a first ciphertext CT1 using a homomorphic threshold encryption algorithm $TEnc_{tpk}$ for encrypting the password pwd under the public key tpk. The threshold encryption algorithm $TEnc_{tpk}$ requires p≤n decryption shares for decryption as explained in more detail below. The first ciphertext CT1, denoted by $C_{pwd}$ in this embodiment, is thus given by:

$$C_{pwd} = TEnc_{tpk}(pwd).$$

The encryption algorithm TEnc is homomorphic, namely there exists an efficient operation ⊙ on ciphertexts C such that, if $C_1 \in TEnc_{tpk}(m_1)$, and $C_2 \in TEnc_{tpk}(m_2)$, then $C_1 \odot C_2 \in TEnc_{tpk}(m_1 \cdot m_2)$. (We will also use exponents to denote the repeated application of ⊙, e.g., $C^2$ to denote C⊙C). The AC server 2 stores the first ciphertext $C_{pwd}$ for the user ID Uid and, in step (c), sends $C_{pwd}$ with Uid to the n authentication severs 6 $S_1$ to $S_n$. Each authentication server 6 $S_i$ stores Uid, together with $C_{pwd}$ in this example, and an account-blocked bit b (initially set to b=0) for a throttling mechanism, as discussed above.

Password Authentication Protocol Embodiment #2

In a subsequent login for the user account, the AC server 2 communicates with k=p authentication servers 6 to implement the password authentication protocol. A simple implementation of this protocol will be described first with reference to FIGS. 10a and 10b. These indicate successive stages in operation of the password authentication protocol. The procedure begins, as indicated at (a) in FIG. 10a, on supply of the user ID Uid and input password pwd' to AC server 2. If a user record for Uid exists in memory 9, then in step (b) the AC server 2 produces the second ciphertext $CT2=C_{pwd'}$ from the input password pwd' using the homomorphic encryption algorithm. In this initial example, the second ciphertext, denoted by $C_{pwd'}$, is given by:

$$C_{pwd'} = TEnc_{tpk}(pwd').$$

In step (c), the AC server 2 then produces a test value $C_{test}$ by combining, via the operation ⊙, the second ciphertext $C_{pwd'}$ and the first ciphertext $C_{pwd}$ stored for the received Uid. In this initial example the operation ⊙ represents division, whereby:

$$C_{test} = C_{pwd}/C_{pwd'}.$$

Due to the homomorphism of the encryption algorithm as explained above, the test value decrypts to a predetermined value of unity if the input password pwd' equals the user password pwd associated with the received Uid. Next, in step (d) the AC server 2 sends the test value $C_{test}$ with Uid to k=p authentication servers 6. The p authentication servers 6 can be selected in any convenient manner here, e.g., as the first p servers to respond, or to implement a load balancing scheme among the n authentication servers 6.

Figure 10A:
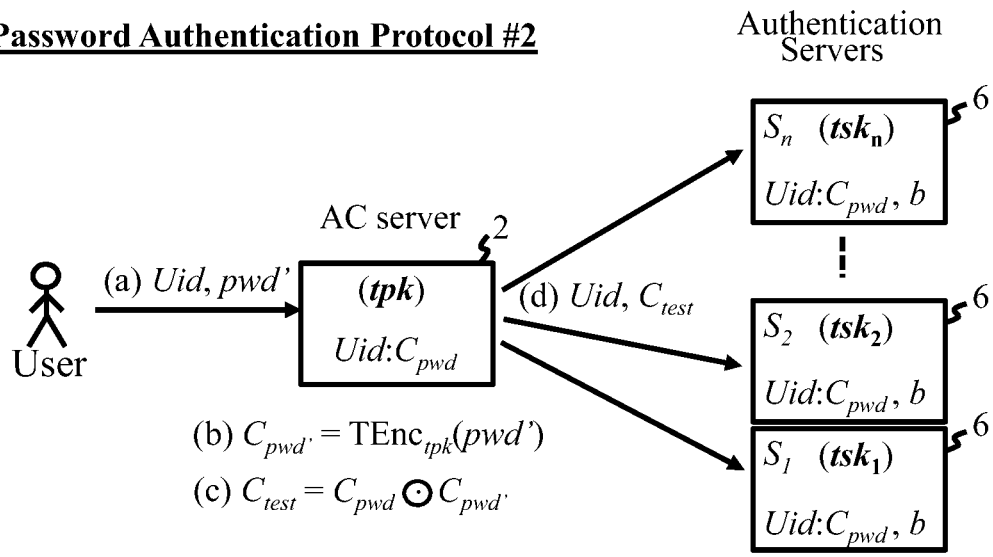
FIGS. 10a and 10b indicate steps of a simple implementation of the password authentication protocol in the second embodiment.
Figure 10B:
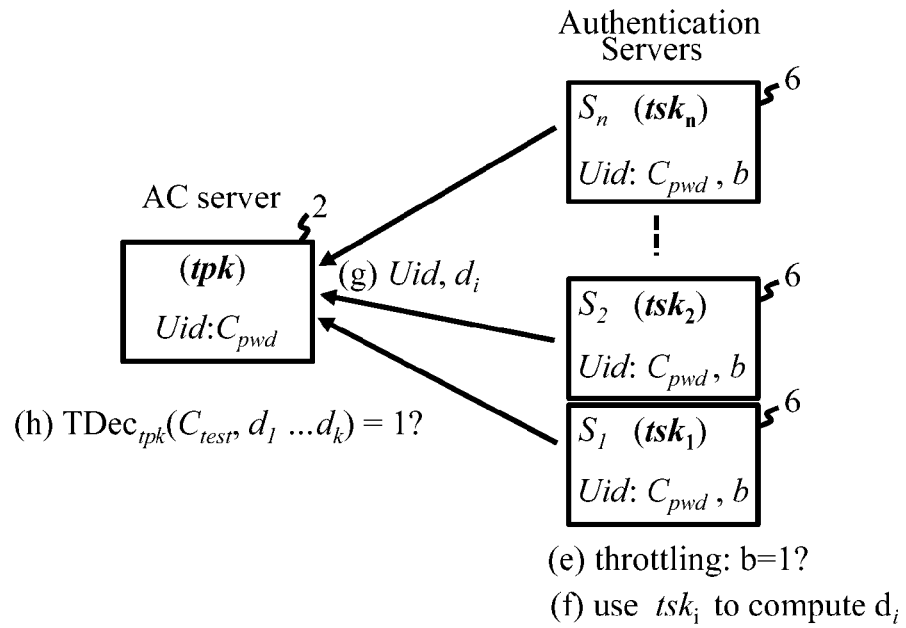

In the next stage of this authentication protocol, as indicated at (e) in FIG. 10b, each authentication server 6 $S_i$ checks whether the user account has been blocked (b=1 for Uid) by the throttling mechanism implemented by the server logic as discussed above. If the user account is blocked at any authentication server 6, the login operation fails. If none of the p servers 6 has blocked the user account, then the login operation can proceed. In this case, as indicated at step (f), each authentication server 6 $S_i$ uses its respective key-share $tsk_i$ to produce a decryption share $d_i$ dependent on the test value $C_{test}$. In this simple example, the server simply decrypts $C_{test}$ using its key-share $tsk_i$ and sends the resulting decryption share $d_i$ for Uid to the AC server 2 in step (g). In step (h), the access control server 2 determines whether the input password pwd' equals the user password pwd by determining from the k decryption shares $d_1 \ldots d_k$ whether the test value decrypts to unity, i.e., whether:

$$TDec(C_{test}, d_1 \ldots d_k)=1,$$

where TDec is the decryption algorithm for the threshold encryption scheme as discussed further below. If so, access is permitted. If pwd'≠pwd then the decryption result will be a random number and access will be denied.

A more detailed implementation of the second password authentication protocol will now be described with reference to FIGS. 11a to 11c. This example incorporates various improvements over the simple example above, and allows throttling to take account of whether earlier user login attempts were successful. A brief description of the threshold description scheme is given first to assist understanding of the protocol to follow.

Threshold Encryption:

A threshold encryption scheme consist of four algorithms (EKGen; TEnc; PDec; TDec). The key generation algorithm EKGen takes input $(1^\lambda, t, n)$, where t denotes the maximum of tolerated malicious servers, and outputs a master public key tpk and n partial key (key-share) pairs $(tpk_1, tsk_1), \ldots, (tpk_n, tsk_n)$. The encryption algorithm TEnc, on input of the public key tpk and a message m, outputs a ciphertext C. The partial decryption algorithm PDec, on input of a secret key-share $tsk_i$, a public key-share $tpk_i$, and a ciphertext C outputs a decryption share $d_i$. The threshold decryption algorithm TDec, on input of C, tpk and k≥t+1 decryption shares $d_1 \ldots d_k$, outputs a plaintext m or ⊥ (error). Various such threshold encryption schemes are known, an exemplary construction being described in Y. Desmedt, Y. Frankel. "Threshold Cryptosystems", Desmedt & Y. Frankel, CRYPTO 1989.

Prior to the setup protocol described above, the AC server 2 creates threshold keys for all n authentication servers 6. That is, it creates keys:

$$(tpk,(tpk_1,tsk_1), \ldots, (tpk_n,tsk_n)) \leftarrow EKGen(1^\lambda,t,n).$$

The secret key-shares $tsk_i$ are sent encrypted to each authentication server 6 $S_i$. The master public key tpk and the public key-shares $tpk_i$ are publicly known in the system. In addition, each authentication server 6 also creates a key $k_i$ for a message authentication scheme ("MAC"), which will be used in the unblock-test for a throttled account as discussed below.

The setup protocol for user accounts is as described with reference to FIG. 9. In the password authentication protocol, the AC server 2 communicates with p=t+1 authentication servers 6 where t is as defined by the threshold encryption scheme above.

Figure 11A:
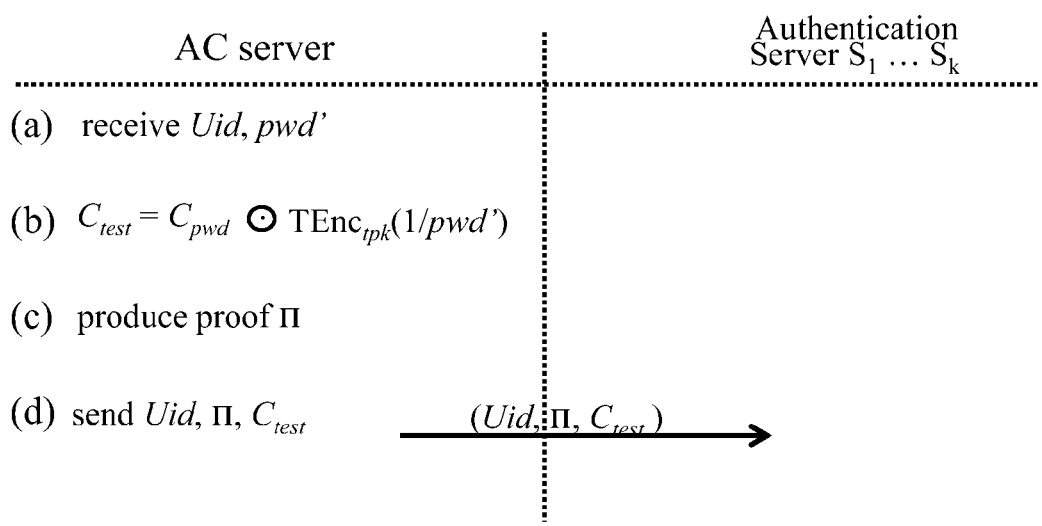
FIGS. 11a to 11c indicate steps of a more sophisticated implementation of the password authentication protocol in the second embodiment.
Figure 11B:
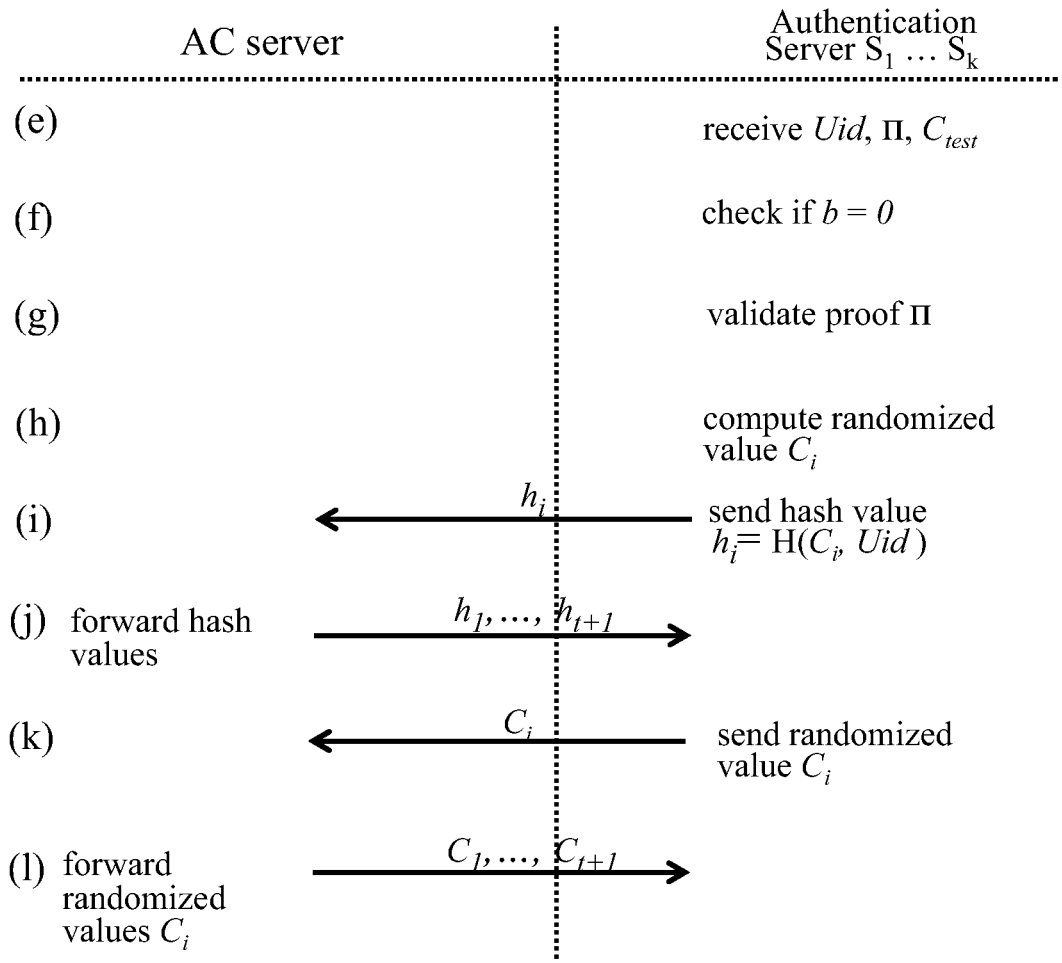
Figure 11C:
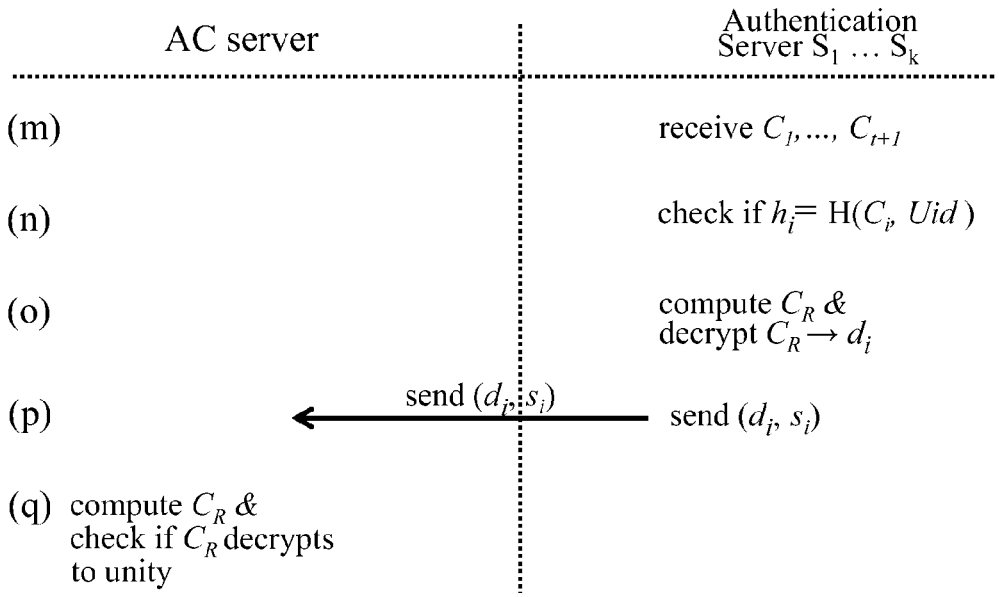

The password authentication protocol is indicated in FIGS. 11a to 11c in terms of interaction between the AC server 2, whose operations are indicated on the left of the figures, and each authentication server 6 whose operations are indicated on the right.

Operation begins at step (a) in FIG. 11a when the user sends Uid and the input password pwd' to AC server 2. If a user record exists for Uid, the AC server 2 continues by computing the second ciphertext CT2=$C_{pwd'}$ from the input password pwd' using the homomorphic encryption algorithm. In this example, the second ciphertext $C_{pwd'}$ is produced by applying the homomorphic encryption algorithm to a function F of the input password pwd', where F(x)=1/x. Hence:

$$C_{pwd'}=TEnc_{tpk}(1/pwd').$$

This ensures that a malicious AC server 2 cannot simply use the first ciphertext $C_{pwd}$ again as the second ciphertext $C_{pwd'}$ in the authentication protocol. The test value $C_{test}$ is then produced by combining $C_{pwd'}$ and $C_{pwd}$ via the operation $\odot$, where in this case $\odot$ represents multiplication:

$$C_{test}=C_{pwd}\odot C_{pwd'}=C_{pwd}\odot TEnc_{tpk}(1/pwd').$$

Due to the homomorphism of the encryption algorithm as explained above, the test value again decrypts to unity if pwd'=pwd. Next, in step (c) the AC server 2 generates a cryptographic proof Π for proving that the test value $C_{test}$ comprises the second ciphertext $C_{pwd'}$ as well as the first ciphertext $C_{pwd}$ for the user ID:

$$\Pi NIZK\{(pwd'):C_{test}=(C_{pwd}\odot TEnc_{tpk}(1/pwd'))\}(C_{test}).$$

(Here "NIZK" means "non-interactive zero-knowledge", where "zero-knowledge" indicates that the prover reveals nothing more than is required to be proved, and "non-interactive" means that verification of the proof does not require interaction between the prover and verifier. Such proofs can be implemented in known manner and suitable protocols for implementing the proof will be apparent to those skilled in the art). In particular, the proof Π allows verification that the test value $C_{test}$ comprises the correct first ciphertext $C_{pwd}$ for Uid and a second ciphertext $C_{pwd'}$ that is correctly computed from the function F of an input password pwd'. In step (d), the AC server 2 then sends the user ID and proof Π to the k=t+1 authentication servers 6 with the test value $C_{test}$.

Referring to FIG. 11b, each authentication server 6 $S_i$ receives (Uid, Π, $C_{test}$) in step (e) and then checks in step (f) that the account for Uid is not blocked, i.e., that b=0. In step (g), the authentication server 6 $S_i$ validates the proof Π to check that (Uid, Π, $C_{test}$) is correct with respect to its locally stored values (Uid, $C_{pwd}$). If either test step (f) or (g) fails, then the user login fails (subject to operation of the unblock protocol discussed below). Assuming both tests are passed, then the authentication server 6 $S_i$ proceeds in step (h) to compute a randomized value $C_i$, comprising the test value raised to the power of a respective random exponent $r_i$:

$$C_i=(C_{test})^{r_i}$$

for a randomly chosen $r_i$. Each server then stores $C_i$ and commits to this value in step (i) by sending a hash value $h_i$ to the AC server 2 where:

$$h_i \leftarrow H(C_i, Uid)$$

and H denotes a cryptographic hash function. When the AC server 2 has received all k=t+1 hash values, it forwards them as ($h_1, h_2, \ldots, h_{t+1}$) to all the authentication servers 6 $S_1$ to $S_k$ in step (j). The k servers now reveal their randomized values $C_i$ by sending them in step (k) to the AC server 2. When the AC server 2 has received all k=t+1 randomized values $C_i$, it forwards them as ($C_1, C_2, \ldots, C_{t+1}$) to all the authentication servers 6 $S_1$ to $S_k$ in step (l).

Referring to FIG. 11c, each authentication server 6 $S_i$ receives ($C_1, C_2, \ldots, C_{t+1}$) in step (m) and checks, in step (n), if $h_i=H(C_i, Uid)$. If so, in step (o) the authentication server 6 $S_i$ combines the set of k=t+1 randomized values $C_i$, via the operation $\odot$ (here multiplication), to produce a randomized ciphertext $C_R$ and uses its respective key-share $tsk_i$ to produce a decryption share $d_i$ from the randomized ciphertext $C_R$:

$$C_R \leftarrow \odot_{i=1,\ldots,t+1} C_i$$

$$d_i \leftarrow PDec_{tski}(tpk_i, C_R).$$

In step (p), the authentication server 6 $S_i$ sends ($d_i, s_i$) to the AC server 2, where $s_i=MAC_{ki}$(Uid,$C_R$) using its key $k_i$ for the message authentication scheme. When the AC server 2 has received the decryption shares and MACs ($d_i, s_i$) of all k=t+1 servers, it uses the threshold decryption algorithm TDec to determine from the decryption shares whether the randomized ciphertext $C_R$ decrypts to unity, and hence pwd'=pwd. This follows because a randomized value $C_i$=1 if the test value $C_{test}$=1 whereby, due to the homomorphism, the randomized ciphertext $C_R$ decrypts to the same value as the test value, i.e. unity, if pwd'=pwd. Hence, in step (q) the AC server 2 computes:

$$C_R \leftarrow \odot_{i=1,\ldots,t+1} C_i \text{ and}$$

$$x \leftarrow TDec_{tpk}(C_R,\{d_i\}_{i=1,\ldots,t+1}).$$

If x=1, the passwords match and access is granted, otherwise login fails.

In the above process, the AC server 2 keeps all decryption shares and MAC values ($d_i, s_i$) for a certain period to permit subsequent proof to an authentication server 6 that the login was successful. In particular, steps (h) to (p) in the above protocol allow an authentication server 6 to check the correctness of an input password in the last login attempt before blocking a user account. Prior to blocking an account due to the throttling mechanism in a subsequent login for the Uid, an authentication server 6 communicates with the access control server 2 to implement an "unblock protocol". This unblock protocol will now be described with reference to FIG. 12.

Unblock Protocol

Figure 12:
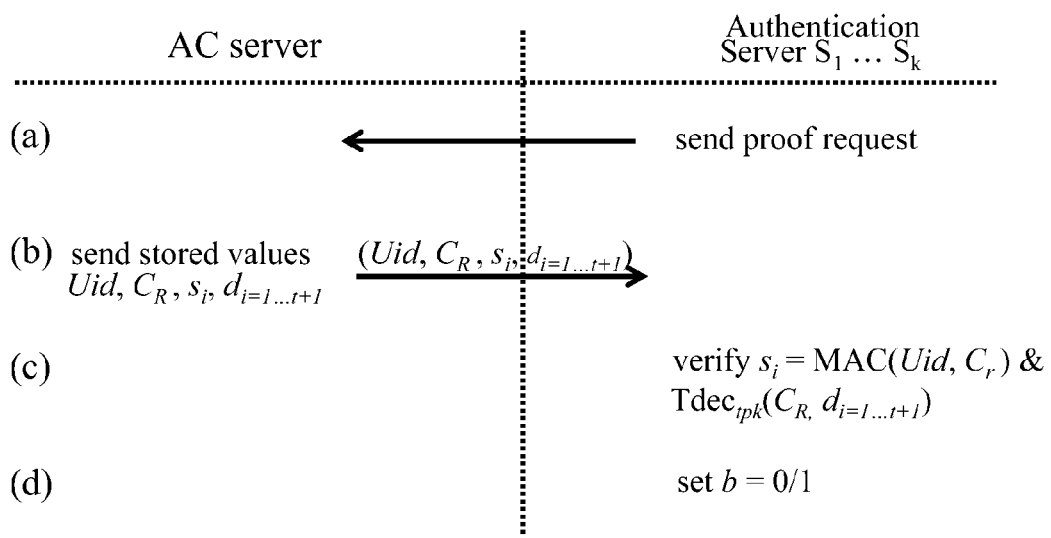
FIG. 12 indicates steps of an unblock protocol in the second embodiment.

The operations performed by the AC server 2 and authentication server 6 in the unblock protocol are indicated respectively on the left and right of FIG. 12. If an authentication server 6 $S_i$ has noted too many login attempts and is about to block the user account for Uid, the authentication server 6 sends a proof request to the AC server 2 requesting proof that the last login was successful, i.e., that the randomized ciphertext $C_R$ decrypted to unity. On sending of such a request in step (a) of FIG. 12, if the last login was successful, the AC server 2 retrieves the values (Uid, $C_R$, $s_i$, $\{d_i\}_{i=1,\ldots,t+1}$) and sends these values to the authentication server 6 in step (b). If the last login was unsuccessful, the AC server 2 sends values (Uid, fail) instead. In step (c), the authentication server 6 $S_i$ verifies whether $s_i=MAC_{ki}$(Uid, $C_R$) and $TDec_{tpk}(C_R,\{d_i\}_{i=1,\ldots,t+1})$=1. Only if both tests succeed does the server keep the account for Uid open. The account-blocked bit b is, thus, set appropriately in step (d), and the protocol is complete.

It will be seen that the above system allows throttling to be based on a password check as well as on login frequency. In addition, the n authentication servers 6 of this embodiment are further configured to implement a share renewal protocol for updating the n key-shares $tsk_i$. This can be implemented in known manner using proactive secret sharing techniques, an example of which is described in "Proactive Secret Sharing Or: How to Cope With Perpetual Leakage", Herzberg et al., CRYPTO 1995. Using such techniques, the authentication servers 6 will run a share renewal protocol for their secret key-shares periodically and/or whenever an adversary has potentially learned a secret key-share. The old shares are deleted after each renewal. The proactive security thereby ensures that, on the one hand, the new secret key-shares $tsk_i$ are still "compatible" with the main public key tpk, while, on the other hand, they are "incompatible" with the old secret shares which the adversary may have acquired.

In the above embodiment, as long as at most t servers (and the DS) are corrupted, an adversary controlling those servers cannot retrieve the passwords, e.g., by mounting offline attacks against $C_{pwd}$. This follows from the security of the threshold encryption scheme which guarantees that $C_{pwd}$ cannot be decrypted if the adversary holds at most t shares of the threshold secret key. Security against DS-insider attacks is provided, since during the login protocol the servers only decrypt a password quotient (of value unity) and not the original password pwd or password attempt pwd'. Thus, a malicious DS cannot simply trigger the decryption of the encrypted passwords but would have to run a full login protocol for each password guess. Due to the throttling mechanism in honest servers, such an attack will be recognized and blocked after a few attempts. This threshold-based scheme even tolerates long-term corruptions of up to t servers, whereby the servers could be outsourced to a different trust domain. Login is especially efficient since only t+1 of the n authentication servers 6 are required for password authentication. As before, operation of the system is completely transparent to users who need only communicate with AC server 2 in all protocols.

While exemplary embodiments have been described, many alternatives and modifications can be envisaged. For example, in other implementations of the first embodiment above, the key $k1_i$ in the above formula for $t2_i$, could be replaced by $PRF(k1_i, Uid)$. Also, since system security does not depend on this particular value, the key $k1_i$ could be replaced by any unique server ID and need not be a cryptographically strong secret. Also, the threshold encryption scheme in the second embodiment could require t+1=n shares for decryption if desired, whereby all n authentication servers 6 would be used for password authentication.

It will be appreciated that the resource protected by access control server 2 may, in general, comprise any resource to which user access is restricted, e.g., an application, service, data, device, network or any other facility or combination of facilities. Also, the functionality of servers in the above embodiments might, in general, be implemented in a single machine or distributed over a plurality of machines. Embodiments might also be envisaged in which the user account data, generated by a setup protocol above, is pre-loaded in the various servers.

Many other changes and modifications can be made to the exemplary embodiments described without departing from the scope of the invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for controlling access by user computers to a resource in dependence on authentication of user passwords, associated with respective user IDs, at an access control server configured to communicate via a network with the user computers and a plurality n of authentication servers, the method comprising:
   storing respective secret values at the plurality n of authentication servers;
   for each said user ID, storing at the access control server a first ciphertext produced by encrypting a user password associated with a user ID using a predetermined algorithm dependent on said secret values;
   at the access control server, in response to receipt from a user computer of a received user ID and an input password, communicating with a plurality $k \leq n$ of authentication servers to implement a password authentication protocol, including use by the plurality k of authentication servers of the respective secret values, in which a second ciphertext is produced by encrypting the input password using said predetermined algorithm and the access control server uses the first and second ciphertexts to determine whether the input password equals the user password for the received user ID; and
   at the access control server, permitting access to the resource by the user computer if the input password equals the user password.

2. The method as claimed in claim 1, wherein:
   the first ciphertext comprises first pseudorandom values, each of which encrypts, via a pseudorandom function, a secret value of a respective authentication server and an initial pseudorandom value;
   the initial pseudorandom value encrypts, via said pseudorandom function, the user password for the respective user ID; and
   to implement said password verification protocol:
   at the access control server, using the input password to produce a test pseudorandom value, which corresponds to said initial pseudorandom value, and sending the test pseudorandom value to a plurality $k=n$ of authentication servers;
   at each of the plurality $k=n$ of authentication servers, using the test pseudorandom value to produce a respective server pseudorandom value, which corresponds to a first pseudorandom value, and sending the server pseudorandom value to the access control server; and
   at the access control server, producing the second ciphertext from the server pseudorandom values, and comparing the first and second ciphertexts to determine whether the input password equals the user password for the received user ID.

3. The method as claimed in claim 1, wherein the first ciphertext is produced using a predetermined homomorphic encryption algorithm for encrypting the user password under a public key of a cryptographic key-pair, the secret values of the plurality n of authentication servers comprise respective key-shares of a secret key of said cryptographic key-pair, and to implement the password authentication protocol in response to receipt of the received user ID and input password:
   at the access control server, producing the second ciphertext from the input password using said homomorphic encryption algorithm;
   at the access control server, producing a test value by combining the second ciphertext and the first ciphertext for the received user ID such that, due to the homomorphism encryption algorithm, the test value decrypts to a predetermined value if the input password equals the user password associated with the user ID;
   at the access control server, sending the test value to the plurality k of authentication servers;
   at each of the plurality k of authentication servers, using its respective key-share to produce a k decryption share dependent on the test value, and sending the k decryption share to the access control server; and
   at the access control server, determining whether the input password equals the user password by determining from the k decryption shares whether the test value decrypts to said predetermined value.

4. The method of claim 2, wherein the first ciphertext comprises a modulo-2 sum of the first pseudorandom values.

5. The method of claim 4, wherein:
- each of the first pseudorandom values comprise a modulo-2 sum of second and third pseudorandom values;
- the second pseudorandom value encrypts said initial pseudorandom value via said pseudorandom function; and
- the third pseudorandom value encrypts, via said pseudorandom function, said secret value of the respective authentication server and the user ID associated with the user password encrypted in said initial pseudorandom value.

6. The method of claim 5, further comprising store a further secret value at the access control server, wherein said initial pseudorandom value encrypts the further secret value via the pseudorandom function.

7. The method of claim 6, further comprising:
- updating the further secret value to a new secret value and using the new secret value to produce an updated pseudorandom value which corresponds to said third pseudorandom value;
- at the plurality n of authentication servers, producing an update value comprising a modulo-2 sum of the updated pseudorandom value and the third pseudorandom value, and sending the update value to the access control server; and
- the access control server, updating the first ciphertext by producing a modulo-2 sum of the first ciphertext and the update value to implement an update protocol.

8. The method of claim 3, wherein:
- said homomorphic encryption algorithm comprises a threshold encryption algorithm which includes p<n decryption shares for decryption; and
- sending said test value at the access control server includes sending said test value to a plurality k=p of authentication servers in the password authentication protocol.

9. The method of claim 3, wherein producing the second ciphertext from the input password using said homomorphic encryption algorithm includes applying said homomorphic encryption algorithm to a function of the input password.

10. The method of claim 1, wherein the secret values include cryptographic keys known only to a respective server in the plurality n of authentication servers.

* * * * *